(12) United States Patent
Pricope et al.

(10) Patent No.: US 7,868,498 B2
(45) Date of Patent: Jan. 11, 2011

(54) MOTOR STATOR ASSEMBLY MOUNTING FEATURES FOR RADIAL MOUNTING TO A SHROUD AND ASSEMBLY METHOD

(75) Inventors: Daniela Pricope, Madsion, AL (US);
Attila Simofi-Ilyes, London (CA);
Andrew Lakerdas, London (CA);
Antonio Giammarco, Delaware (CA);
Bonifacio Castillo, London (CA)

(73) Assignee: Brose Fahrzeugteile GmbH & Co. Kommanditgesellschaft, Würzburg (DE)

( * ) Notice: Subject to any disclaimer, the term of this patent is extended or adjusted under 35 U.S.C. 154(b) by 1139 days.

(21) Appl. No.: 11/367,782

(22) Filed: Mar. 3, 2006

(65) Prior Publication Data

US 2006/0202578 A1    Sep. 14, 2006

Related U.S. Application Data

(60) Provisional application No. 60/660,137, filed on Mar. 9, 2005.

(51) Int. Cl.
*H02K 9/06* (2006.01)
*H02K 5/10* (2006.01)
*H02K 5/20* (2006.01)

(52) U.S. Cl. .......................................... 310/89; 310/91
(58) Field of Classification Search ................... 310/51, 310/89, 91, 154.01, 218, 254, 40 MM; 417/366, 417/423.14, 423.15; 248/345
See application file for complete search history.

(56) References Cited

U.S. PATENT DOCUMENTS

| 4,482,124 | A | * | 11/1984 | Dochterman | 248/604 |
| 5,237,231 | A | * | 8/1993 | Blaettner et al. | 310/239 |
| 5,268,607 | A | * | 12/1993 | McManus | 310/89 |
| 5,521,447 | A | * | 5/1996 | Bertolini et al. | 310/51 |
| 6,755,157 | B1 | * | 6/2004 | Stevens et al. | 123/41.49 |

* cited by examiner

*Primary Examiner*—Quyen Leung
*Assistant Examiner*—David W. Scheuermann
(74) *Attorney, Agent, or Firm*—Manelli Denison & Selter PLLC; Edward J. Stemberger

(57) ABSTRACT

A motor case assembly 20 a permanent magnet D.C. electric motor includes a motor case 24 having a generally cylindrical wall 25, a closed end 21, and an open end 23 opposite the closed end, defining an interior 27. Permanent magnet structure 26 is mounted to the wall 25 in the interior 27. A surface defines at least one hole 22 through the wall 25. The hole 22 is constructed and arranged to be employed in mounting the case 20 to a shroud to obtain a mass balance distribution of a motor shroud assembly.

14 Claims, 3 Drawing Sheets

MOTOR STATOR ASSEMBLY MOUNTING FEATURES FOR RADIAL MOUNTING TO A SHROUD AND ASSEMBLY METHOD

This application is based on U.S. Provisional Application No. 60/660,137, filed on Mar. 9, 2005 and claims the benefit thereof for priority purposes.

FIELD OF THE INVENTION

This invention relates to Permanent Magnet Direct Current Motors (PMDCM) for automotive applications such as engine cooling.

BACKGROUND OF THE INVENTION

Electric motors used in engine cooling applications need some type of mounting feature on the stator assembly to provide adequate fastening to a shroud. The stator assembly is the stationary member of the electric motor. The two most commonly used features are shown FIG. 1 and FIG. 2.

FIG. 1 shows an electric motor 10 where the motor mounting features (to shroud) are conventional brackets 12 welded to the motor case/stator assembly 14. An end cap (not shown) of the motor is at the opposite side to the fan side A. With this configuration, the function of the end cap is to provide coverage to the motor at the opposite side of the fan and to hold a bearing/bushing assembly (not shown) for supporting a motor shaft. However, the end cap does not have structural function with regard to the motor mounting to the shroud.

FIG. 2 shows another electric motor 10' that is functionally the same as the motor 10 of FIG. 1; however, the conventional mounting features to mount the motor 10' to the shroud are flanges 15 integrated with the end cap 16 that covers an end of the motor case/stator assembly 14.

Conventional motor to shroud attachments are illustrated in FIG. 3 and FIG. 4. FIG. 3 shows the motor 10 to shroud 18 connection for motor 10 of FIG. 1. FIG. 4 shows the motor 10' to shroud 18 connection for motor 10' of FIG. 2. In both configurations, the fastening method is done with a screw fastener 20. A conventional fan 22 is driven by the associated motor 10, 10'.

The welded brackets 12 of motor 10 increase the overall cost of the system due to the cost of three brackets and the cost of a welding operation. The flanges 15 on the end cap of motor 10' increase the overall system cost due to the cost of a larger and thicker piece of material used to make the end cap having the flanges.

Since there is a high demand to reduce the system cost of the engine cooling module, there is a need to reduce the cost of the attachment mechanism of a motor to a shroud.

SUMMARY OF THE INVENTION

An object of the present invention is to fulfill the need referred to above. In accordance with the principles of the present invention, this objective is obtained by providing a motor case assembly for a permanent magnet D.C. motor. The case assembly includes a motor case having a generally cylindrical wall, a closed end, and an open end opposite the closed end, defining an interior. Permanent magnet structure is mounted to an inside surface of the wall within the interior. A surface defines at least one hole through the wall. The hole is constructed and arranged to be employed in mounting the case to a shroud.

In accordance with another aspect of the invention, a method is provided for mounting a motor case assembly for a permanent magnet D.C. motor to a shroud. The method provides a motor case assembly comprising a motor case having a generally cylindrical wall defining an interior; permanent magnet structure mounted to an inside surface of the wall within the interior; and a surface defining at least one hole through the wall. A shroud is provided having a motor mounting ring. The motor mounting ring is placed about an outer surface of the wall of the case. Fastening structure, associated with the motor mounting ring, is caused to be received in the at least one hole to mount the case to the shroud.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 5:
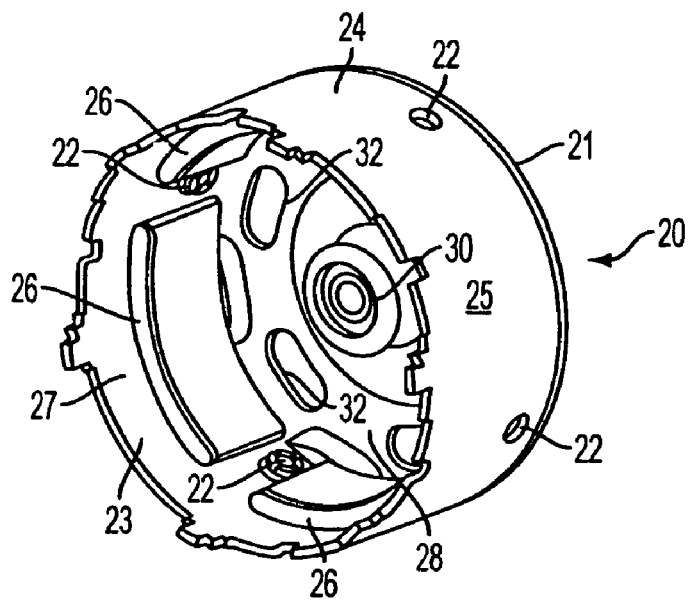
FIG. 5 is a view motor case assembly having hole features therein, provided in accordance with the principles of the present invention.

With reference to FIG. 5, a motor case assembly, generally indicated at 20, is shown in accordance with the principles of the present invention, for use in a PMDC motor. The assembly 20 includes a motor case 24 having a generally cylindrical wall 25, a closed end 21, and an opposing open end 23, defining an interior 27. Magnet structure 26 is mounted to the inside surface of wall 25 within the interior 27. In the embodiment, four permanent magnets 26 are provided, although one or more magnets can be provided. The assembly 20 defines a stator assembly of a PMDC motor that receives a conventional armature assembly (not shown). The stator assembly is the stationary member of the motor.

The motor case 24 includes surfaces defining at least one hole-feature 22 (e.g., holes punched/extruded) passing through the cylindrical wall 25 in the radial direction. In the illustrated embodiment, the hole-features 22 are positioned between the magnets 26. The hole-features 22 are placed so as to not disturb the magnetic circuit and to provide a balanced mass distribution of the motor with fan and shroud attached.

FIG. 5 shows four hole-features 22 in the motor case 24 for motor mounting. However, more or fewer holes 22 can be used depending on the motor mounting ring configuration and interface detail on the shroud to which the motor case 24 is mounted. A front plate 28 of the case 24 is provided to hold a bearing assembly 30 concentric to a center of the motor case 24 for supporting a shaft of the armature assembly of a motor. The front plate 28 can be made integral with the case 24 or can be a separate member that is coupled to the case. In addition, in the illustrated embodiment, the plate 28 provides some ventilation and coverage to the motor via surfaces defining openings 32 in the front plate 28. It can be appreciated that certain motors do not need such ventilation thus, the opening 32 need not be provided.

Figure 1:
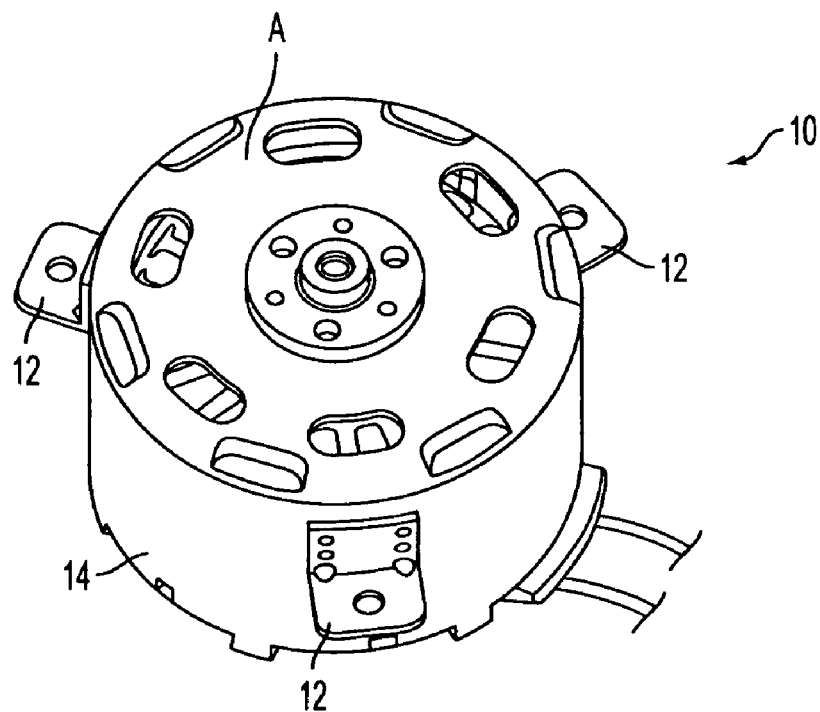
FIG. 1 is a view of a conventional permanent magnet direct current (PMDC) motor showing welded mounting features for mounting to a shroud.
Figure 2:
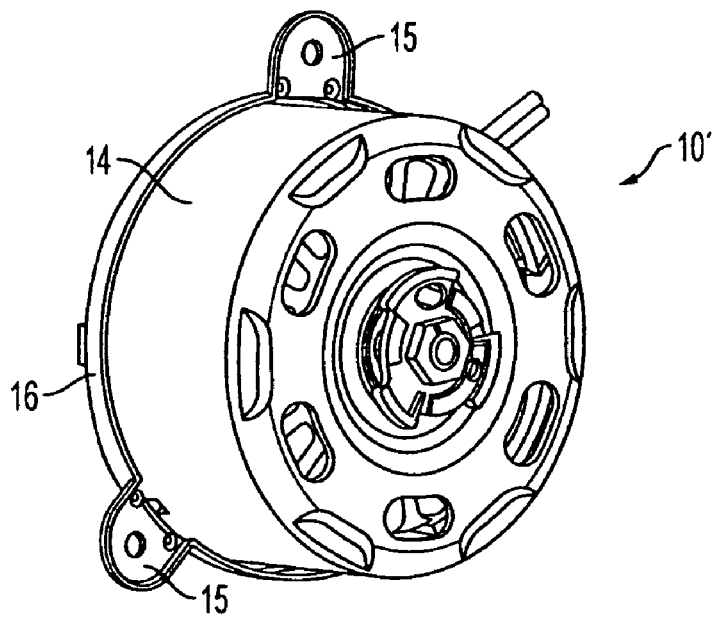
FIG. 2 is a view of a conventional PMDC motor showing an end cap with mounting flange features for mounting to a shroud.
Figure 3:
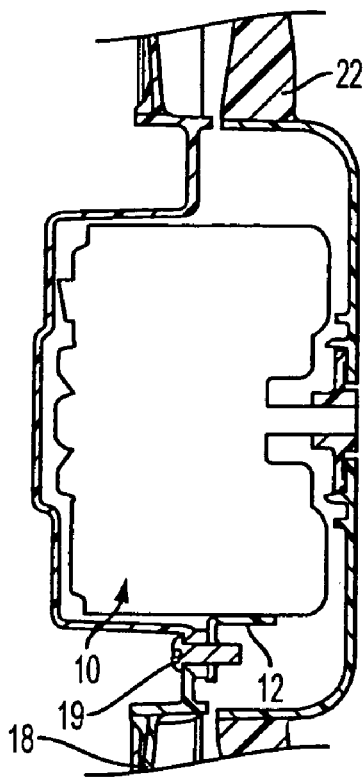
FIG. 3 is a sectional view of the motor of FIG. 1 shown mounted to a shroud.
Figure 4:
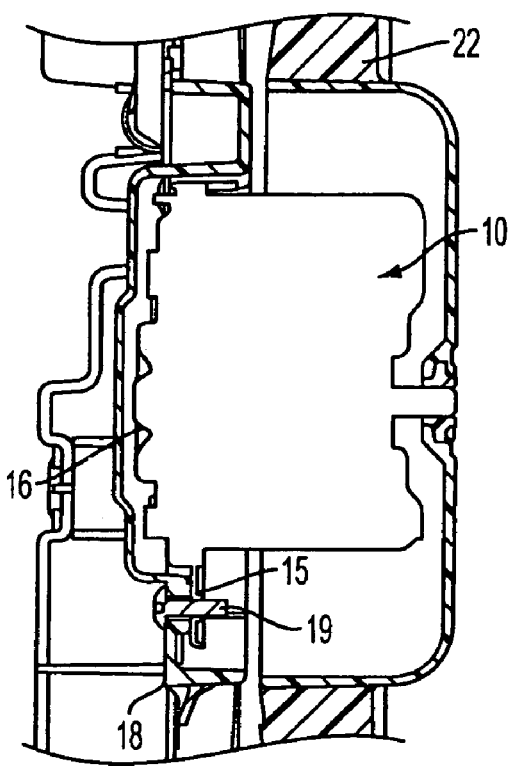
FIG. 4 is a sectional view of the motor of FIG. 2 shown mounted to a shroud.
Figure 6:
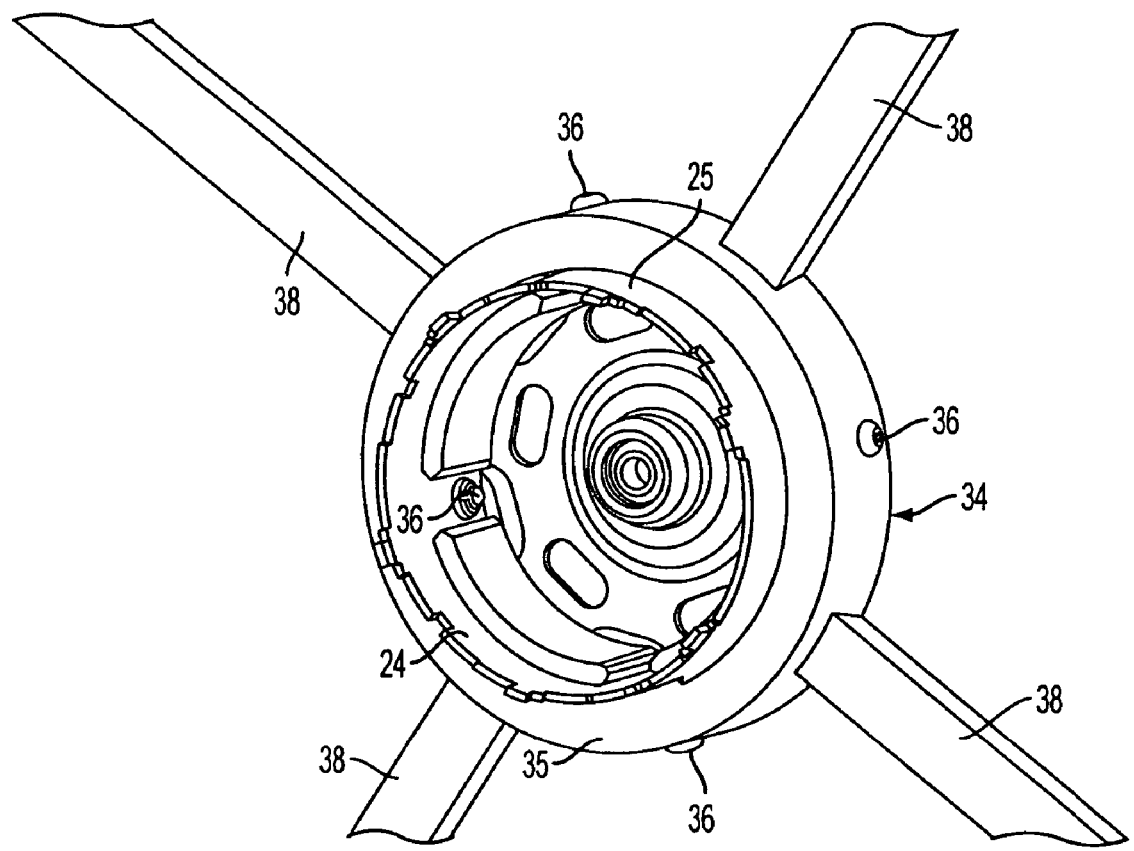
FIG. 6 is a view of the motor case assembly of FIG. 5 shown mounted to a portion of a shroud.

FIG. 6 is shows a typical assembly of the motor case 24 to a shroud, generally indicated at 34. The shroud 34 includes a motor mounting ring 35 constructed and arranged to be disposed about an outer surface of the cylindrical wall 25 of the motor case 24. The shroud 34 also includes stator arms 38 extending from the ring. In the embodiment, the holes 22 are threaded and four fasteners 36 (e.g, screws) are used. However, as noted above, fewer (e.g., 2 screws) or more fasteners can be used depending on the configuration of the motor mounting ring 35 of the shroud 34. Alternative fastening methods can be employed to secure the shroud 34 to the motor case 24 as noted below, such as rivets (item 36' in FIG. 6). The advantage of this assembly is reduced cost, since the mounting detail is an integral part of the motor case 24. Therefore, no additional components are required. Furthermore, the radial mounting hole-features 22 in the motor case 24 can be positioned generally in the same plane as the center of gravity of the motor/fan assembly. This results in a balanced mass distribution within a motor-shroud assembly comprising the motor with a fan of the type shown in FIG. 3, and the shroud 34. Hence, the stiffness of the shroud 34 and stator (including motor case 24) can be reduced, which consequently contributes to cost saving due to less plastic usage.

Thus, the motor to shroud fastening feature of the embodiment is integrally part of the motor case 24. The fastening feature is formed from the motor case 24 and fastened (such as but not limited to: clamped, staked, screw attachment via threads, riveted, glued or molded) to the motor mounting ring 35 on the shroud. Thread cutting screws can be used to cut threads in the hole features 22 or, to prevent metal shavings from entering the motor, the thread forming screws can be used which deform the metal and do not cut metal.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A motor case assembly for a permanent magnet D.C. motor, the case assembly comprising:
    a motor case having a generally cylindrical wall, a closed end, and an open end opposite the closed end, defining an interior,
    permanent magnet structure mounted to an inside surface of the wall within the interior, and
    a surface defining at least one hole through the wall, the hole being constructed and arranged to be employed in mounting the case directly to a shroud,
    wherein the motor case assembly is in combination with the shroud, the shroud including a motor mounting ring disposed about an outer surface of the wall of the case so as to completely surround the case, wherein fastening structure, engaged with the motor mounting ring, is received in the at least one hole to mount the case directly to the motor mounting ring.

2. The assembly of claim 1, wherein the permanent magnet structure includes four permanent magnets and wherein four holes are provided, the holes being disposed between the magnets.

3. The assembly of claim 1, wherein the closed end of the case includes a bearing assembly constructed and arranged to support a shaft of a motor.

4. The assembly of claim 1, wherein the closed end of the case includes surfaces defining vent holes therein.

5. The assembly of claim 1, wherein the surface defining a hole is threaded.

6. The assembly of claim 5, wherein each fastening structure is a screw engaged with an associated threaded hole.

7. The assembly of claim 1, wherein each fastening structure is a rivet.

8. A motor case assembly for a permanent magnet D.C. motor, the case assembly comprising:
    a motor case having a generally cylindrical wall defining an interior,
    permanent magnet structure mounted in to an inside surface of the wall within the interior, and
    means, provided through the wall, for mounting the case directly to a shroud,
    wherein the motor case assembly is in combination with the shroud, the shroud including a motor mounting ring disposed about an outer surface of the wall of the case so as to completely surround the case, wherein means for fastening, engaged with the motor mounting ring, is received in the means for mounting to mount the case directly to the motor mounting ring.

9. The assembly of claim 8, wherein the permanent magnet structure includes four permanent magnets and the means for mounting includes four holes through the wall, the holes being disposed between the magnets.

10. The assembly of claim 8, wherein the case includes an open end and a closed end opposite the open end, the closed end including a bearing assembly constructed and arranged to support a shaft of a motor.

11. The assembly of claim 10, wherein the closed end of the case includes surfaces defining vent holes therein.

12. The assembly of claim 8, wherein the means for mounting includes a plurality of threaded holes.

13. The assembly of claim 12, wherein the means for fastening is a screw engaged with an associated threaded hole.

14. The assembly of claim 8, wherein the means for mounting includes holes, and the means for fastening is a rivet received in an associated hole.

* * * * *